Patented Feb. 25, 1941

2,232,892

UNITED STATES PATENT OFFICE 2,232,892

PROCESS OF DYEING NITROGENOUS COMPOUNDS OF HIGH MOLECULAR WEIGHT AND THE PRODUCTS THUS OBTAINED

Jürgen von Klenck, Frankfort-on-the-Main, Germany, assignor to General Aniline & Film Corporation, a corporation of Delaware No Drawing. Application June 8, 1938, Serial No. 212,514. In Germany June 18, 1937

28 Claims. (Cl. 8—1)

The present invention relates to nitrogenous compounds of high molecular weight; it more particularly relates to a process of dyeing nitrogenous compounds of high molecular weight and to the products thus obtained.

I have found that nitrogenous compounds of high molecular weight react with organic bodies containing one or more reactive atoms or atom groupings.

Suitable nitrogenous compounds are, for instance: Wool of every kind and origin, human and animal hair, such as hare's and rabbit's hair, goat's hair, cow's hair; furthermore natural silk, both wild and real silk, and other animal fibers of natural origin. There may further be used gelatine, casein and glue, other albuminous substances and products obtained by condensing albuminous substances with formaldehyde or other hardening agents, condensation products from urea and formaldehyde and other nitrogenous plastic masses which may be soluble or insoluble in water. There are further suitable animalized staple fiber and cellulose as well as cellulose derivatives with which basic nitrogenous compounds have been incorporated.

It is an object of the invention to cause the nitrogenous compounds of high molecular weight to react with such organic bodies as contain, besides the exchangeable atoms or atom groupings, chromophoric groups. Very fast dyeings are thereby obtained. Such chromophoric groups are, for instance, the anthraquinone ring system, the azo group and the triphenyl-methane radical. The organic compounds containing such radicals may contain further substituents. Especially the water-soluble compounds are very suitable in the present process. As substituents rendering the organic compounds soluble in water there may be present sulfonic acid groups or carboxylic acid groups. The compounds containing several hydroxyl groups or polyether groups or a quaternary ammonium group may also be water-soluble. Water-insoluble organic compounds are, however, also applicable. The mobile group, for instance, halogen, a nitro group or a hydroxyl group of the organic compound combines with a hydrogen atom of the nitrogenous compound of high molecular weight and is eliminated during the reaction, the organic radical being introduced into the molecule of the high-molecular nitrogenous compound by a stable chemical bond.

If wool is treated, for instance, in an acid bath with 1-amino-4-bromo-2-anthraquinone-sulfonic acid, a feebly orange dyeing is obtained. This dyeing is produced by formation of a salt or by adsorption of the 1-amino-4-bromo-2-anthraquinone-sulfonic acid. If this dyed material is thereupon introduced into a bath containing per liter 4 grams of sodium bicarbonate and treated for one hour at 80° C., condensation sets in, and a deep bluish-red dyeing is obtained which is very fast to washing and fulling.

Particularly suitable for condensation with nitrogenous compounds of high molecular weight are organic compounds in which the reactive groups are activated owing to their position in the molecule. There may be named as examples alpha-anthraquinone derivatives, the halogen atom contained in 1-, 4-, 5- or 8-halogen-anthraquinone having an especial capacity of being substituted when caused to react with suitable compounds. Aromatic azo-compounds containing in the benzene ring, in para- or ortho-position to the azo-group, halogen atoms or other groups capable of being exchanged are, likewise, especially suitable for use in the present invention. The same applies to triphenyl-methane compounds in which groups capable of being exchanged are present in ortho- or para-position to the central carbon atom.

The bodies used for the condensation may be applied in aqueous solutions in case they contain solubilizing groups as above defined. Instead of water-soluble compounds there may also be used insoluble bodies; in this case, it is necessary to finely disperse the compounds before the reaction. For this purpose, there may preferably be used diluents such as mono- or polyhydric alcohols and dispersing agents such as soap, fatty alcohol sulfonates, fatty acid condensation products, condensation products from organic compounds and ethylene oxide or quaternary ammonium compounds of high molecular weight. There may further be added protective colloids, for instance methyl cellulose, sulfite cellulose waste liquor or starch.

The nitrogenous compounds are preferably caused to react with the above-named organic compounds, in water or in a medium containing water, by treating them with solutions or suspensions of the reactive organic compounds, fast dyeings being thus obtained. Substances capable of fixing by-products, such as hydrogen halide, may be added to the reaction medium. Such products are, for instance, carbonates or bicarbonates of alkali metals, of alkaline earth metals or of organic bases. There may further be used alkali acetates or organic bases, such as triethanol-amine, pyridine and the like. In order to accelerate the reaction, there may also be added catalysts, such as metals, for instance, copper or nickel in a finely divided form, metal salts or metal complex compounds such as pyridinium compounds. The reaction is advantageously carried out at temperatures of from 80° C. to 100° C., in case it is operated in an aqueous medium. Low temperatures may also be applied in some cases, but also higher temperatures are applicable, if steam is used. It is not always necessary to heat the material in a liquid; it is, for instance, also possible to heat the nitrogenous compound, after having treated it with the reactive body, in a steam atmosphere to which ammonia, pyridine or similar volatile bases may be added.

Under the conditions indicated, the organic compounds characterized above react with the nitrogeneous compound in such a manner that the reactive hydrogen atoms of the substrata are eliminated with the reactive groups of the organic compounds, the two bodies being then chemically bound, according to the following scheme:

wherein R is an organic radical, X stands for an atom or atom grouping of the organic compound that can be exchanged, H is hydrogen and HY is a group, the hydrogen atom of which is capable of being exchanged, W being the residue of the nitrogenous compound of high molecular weight.

Such chemical bonds are very stable; the products formed by condensation are no salts or addition products, but substitution products. Thus, the effects obtained by condensation are very fast to the action of water, washing solutions and chemical influences.

Since the condensation is a reaction wherein substitution occurs, a deepening of the color can be obtained by condensation with chromophores according to the kind of the chromophore; the nitrogenous body, which forms a substratum, acts as auxochrome.

It is not necessary for the condensation that the compound should immediately be caused to react with the substratum under the conditions which are the most favorable for the condensation. If there is used, for example, a sulfonic acid, it may first be applied on the substratum, for instance in the manner usually applied in dyeing with acid wool dyestuffs, and later be caused to react with the substratum; in this condensation it is advantageous to use feebly alkaline liquors or to work in a moist, alkaline atmosphere, for instance by using volatile bases.

In certain circumstances it is preferable to treat the material, subsequently to the condensation, with a washing agent in an acid or alkaline medium, in order to remove products which may have been formed from the organic compounds used for the condensation or soluble decomposition products of the substratum previously present or formed during the reaction.

Various effects may be obtained by the condensation. When organic compounds are used which are themselves colored or become colored by the introduction of an auxochrome, that is to say compounds which are chromophores, the dyeings obtained are very fast to wet processing.

The process is, therefore, especially suitable for producing fast dyeings.

The following examples serve to illustrate the invention, but they are not intended to limit it thereto:

(1) 10 grams of wool are treated for 1½ hours at 80° C. in 300 cc of an aqueous solution containing: 0.03 gram of 1-amino-4-bromo-2-anthraquinone-sulfonic acid and 3 grams of sodium bicarbonate. A deep bluish-red dyeing is obtained which is very fast to washing and fulling.

(2) 10 grams of wool are dyed, in the manner usually applied with acid dyestuffs, in an acetic acid bath with 1-amino-4-bromo-2-anthraquinone-sulfonic acid. The wool is then introduced into a bath containing per liter 4 grams of sodium bicarbonate and treated therein for one hour at 80° C. The acid, feebly orange dyeing assumes the depth and shade of that obtained according to Example 1. Whereas the acid dyeing is only very insufficiently fast to wet processing, the properties of fastness in this respect have become very good after the alkaline treatment.

(3) Wool is dyed, under the conditions usual in acid bath dyeing, with 1-amino-4-bromo-2-anthaquinone-sulfonic acid and then exposed, for half-an-hour, to an ammoniacal atmosphere. The initially orange wool has assumed a vivid bluish-red color.

(4) Wool is treated, under the conditions indicated in example 1, with 1-amino-4-bromo-2-anthraquinone-sulfonic acid with addition of a trace of copper salt. A deep, bluish-red dyeing is obtained. In examples 1–4, silk may be treated instead of wool. Artificial masses from gelatine or Galalith can be treated in the same manner.

| Name of the product | Dyeing in an acid bath on wool | Dyeing on wool according to the present invention | Fastness to wet processing of the acid dyeing | Fastness of the dyeing according to the present invention |
|---|---|---|---|---|
| 1-amino-4-bromo-2-anthraquinone-methane-sulfonic acid | Orange | Bluish-red | Very bad | Very good. |
| 1-anilino-4-bromo-2-anthraquinone-sulfonic acid | Red | Violet | Moderate | Do. |
| 1-amino-4-bromo-5-anthraquinone-sulfonic acid | Yellow | do | Insufficient | Do. |
| 1-hydroxy-4-bromo-2-anthraquinone-sulfonic acid | do | Bluish-red | do | Do. |
| 1.5-dibromo-4.8-dihydroxy-2.7-anthraquinone-disulfonic acid | Yellow-brown | Green | do | Do. |
| 1-amino-4-iodo-6-anthraquinone-sulfonic acid | Red | Violet | Moderate | Do. |
| 1-amino-4-iodo-2.6-anthraquinone-disulfonic acid | do | do | Deficient | Do. |
| 1-chloro-anthraquinone-8-sulfonic acid | Nearly colorless | Brownish | | Do. |
| 1-amino-anthraquinone-2-carboxylic acid | Brown | Violet | Deficient | Do. |
| 1-amino-2.4-dibromo-anthraquinone-5-sulfonic acid | Orange | do | do | Do. |
| 1.8-dihydroxy-4.5-dinitro-anthraquinone-disulfonic acid | Red | Blue | do | Do. |
| An anthraquinone derivative obtained according to German specification No. 602,904, paragraph 2. | Orange | Violet | do | Do. |
| 1.4-dichloro-anthraquinone-6-sulfonic acid obtained by the process of German specification No. 216,071, Examples 1 and 2. | Nearly colorless | Brown | Insufficient | Do. |
| 1-amino-2.4-dibromo-anthraquinone-6-sulfonic acid | Red | Blue | Deficient | Do. |
| Toluylene red RT, Schultz, Farbstofftabellen, 7th ed., No. 425 | do | An essentially intenser red. | Insufficient | Good. |
| Rhodamine 5 G extra, Schultz, Farbstofftabellen, 7th ed., No. 862 | Pink | Red | Moderate | Very good. |
| Eosin G extra, Schultz, Farbstofftabellen, 7th ed., No. 881 | do | Essentially intenser. | Moderately good. | Good. |
| 1-amino-2.4-dibromo-7-anthraquinone-sulfonic acid | Red | Blue | Deficient | Very good. |

I claim:

1. The method of coloring wool which comprises causing wool to react, at an elevated temperature and in the presence of acid-binding compounds, with water-soluble organic compounds containing chromophoric groups and groups capable of splitting off acid by reaction with the hydrogen atoms of the amino groups of the wool.

2. The method of coloring gelatine which comprises causing gelatine to react, at an elevated temperature and in the presence of acid-binding compounds, with water-soluble organic compounds containing chromophoric groups and groups capable of splitting off acid by reaction with the hydrogen atoms of the amino groups of the gelatine.

3. The method of coloring wool which comprises causing wool to react, at an elevated temperature and in the presence of acid-binding agents, with alpha-halogen-anthraquinone-sulfonic acids.

4. The method of coloring gelatine, which comprises causing gelatine to react, at an elevated temperature and in the presence of acid-binding agents, with alpha-halogen-anthraquinone-sulfonic acids.

5. The method of coloring fibrous or plastic materials containing amino groups, which comprises causing the said materials to react, at an elevated temperature and in the presence of acid-binding compounds, with 1.5-dibromo-4.8-dihydroxy-2.7-anthraquinone-disulfonic acid.

6. The method of coloring fibrous or plastic materials containing amino groups, which comprises causing the said materials to react, at an elevated temperature and in the presence of acid-binding compounds, with 1.8-dihydroxy-4.5-dinitro-anthraquinone-disulfonic acid.

7. The method of coloring fibrous or plastic materials containing amino groups, which comprises causing the said materials to react, at an elevated temperature and in the presence of acid-binding compounds, with 1.4-dichloro-anthraquinone-6-sulfonic acid.

8. Wool colored by substitution of at least one hydrogen atom of an amino group by a radical containing chromophoric groups.

9. Gelatine colored by substitution of at least one hydrogen atom of an amino group by a radical containing chromophoric groups.

10. Wool colored by substitution of at least one hydrogen atom of an amino group by a radical of the anthraquinone series containing $SO_3H$ bound to the amino group by the alpha-position of the anthraquinone ring system.

11. Gelatine colored by substitution of at least one hydrogen atom of an amino group by a radical of the anthraquinone series containing $SO_3H$ bound to the amino group by the alpha-position of the anthraquinone ring system.

12. A process for coloring fibrous or plastic materials containing amino groups which comprises causing the material to react with organic compounds containing chromophoric groups and acid residues capable of splitting off acid by reaction with the hydrogen atoms of the amino groups of the material at an elevated temperature and in the presence of an acid-binding compound, whereby the reactive acid residues of the organic compound are eliminated together with the hydrogen of the amino groups of the material.

13. A process for coloring fibrous or plastic materials containing amino groups which comprises causing the material to react with organic compounds containing chromophoric groups and acid residues capable of splitting off acid by reaction with the hydrogen atoms of the amino groups of the material at an elevated temperature and in the presence of an acid-binding compound, and of a catalyst selected from the group consisting of metals, metal salts and complex metal compounds, whereby the reactive acid residues of the organic compound are eliminated together with the hydrogen of the amino groups of the material.

14. A process for coloring fibrous or plastic materials containing amino groups which comprises causing the material to react with halogen-anthraquinone sulfonic acids at an elevated temperature and in the presence of an acid-binding compound, whereby the reactive acid residues of the organic compound are eliminated together with the hydrogen of the amino groups of the material.

15. Fibrous materials containing amino groups colored by substitution of at least one hydrogen atom of an amino group by a radical containing chromophoric groups.

16. Plastic materials containing amino groups colored by substitution of at least one hydrogen atom of an amino group by a radical containing chromophoric groups.

17. Fibrous materials containing amino groups colored by substitution of at least one hydrogen atom of an amino group by a radical containing chromophoric groups and a member of the group consisting of $SO_3H$ and $COOH$.

18. Plastic materials containing amino groups colored by substitution of at least one hydrogen atom of an amino group by a radical containing chromophoric groups and a member of the group consisting of $SO_3H$ and $COOH$.

19. Fibrous materials containing amino groups colored by substitution of at least one hydrogen atom of an amino group by a radical of the anthraquinone series.

20. Plastic materials containing amino groups colored by substitution of at least one hydrogen atom of an amino group by a radical of the anthraquinone series.

21. Fibrous materials containing amino groups colored by substitution of at least one hydrogen atom of an amino group by a radical of the anthraquinone series containing $SO_3H$ bound to the amino group of the nitrogenous material by the alpha-position of the anthraquinone ring system.

22. Plastic materials containing amino groups colored by substitution of at least one hydrogen atom of an amino group by a radical of the anthraquinone series containing $SO_3H$ bound to the amino group of the nitrogenous material by the alpha-position of the anthraquinone ring system.

23. Fibrous materials containing amino groups colored by condensation with 1.5-dibromo-4.8-dihydroxy-2.7-anthraquinone-disulfonic acid, wherein at least one hydrogen atom of an amino group is eliminated with the reactive acid residue of the acid dyestuff.

24. Plastic materials containing amino groups colored by condensation with 1.5-dibromo-4.8-dihydroxy-2.7-anthraquinone-disulfonic acid, wherein at least one hydrogen atom of an amino group is eliminated with the reactive acid residue of the acid dyestuff.

25. Fibrous materials containing amino groups colored by condensation with 1.8-dihydroxy-4.5-dinitro-anthroquinone-disulfonic acid, wherein at least one hydrogen atom of an amino group is eliminated with the reactive acid residue of the acid dyestuff.

26. Plastic materials containing amino groups colored by condensation with 1.8-dihydroxy-4.5-dinitro-anthroquinone-disulfonic acid, wherein at least one hydrogen atom of an amino group is eliminated with the reactive acid residue of the acid dyestuff.

27. Fibrous materials containing amino groups colored by condensation with 1.4-dichloro-anthraquinone-6-sulfonic acid, wherein at least one hydrogen atom of an amino group is eliminated with the reactive acid residue of the acid dyestuff.

28. Plastic materials containing amino groups colored by condensation with 1.4-dichloro-anthraquinone-6-sulfonic acid, wherein at least one hydrogen atom of an amino group is eliminated with the reactive acid residue of the acid dyestuff.

JÜRGEN VON KLENCK.